Jan. 13, 1970   J. C. VELVIN, JR   3,489,316

SELF-SERVICE DISPENSING SYSTEM

Filed May 1, 1967

INVENTOR
JAMES C. VELVIN, JR.

United States Patent Office 3,489,316
Patented Jan. 13, 1970

3,489,316
SELF-SERVICE DISPENSING SYSTEM
James C. Velvin, Jr., 1920 E. Lancaster,
Fort Worth, Tex. 76103
Filed May 1, 1967, Ser. No. 639,925
Int. Cl. B67d 5/30
U.S. Cl. 222—19
4 Claims

ABSTRACT OF THE DISCLOSURE

This invention relates to a dispensing system for use in auto service centers and, more particularly, to an automatic dispensing system by which customers of automotive supplies may serve themselves through the operation of a controlled fluid dispensing device, the device being programmed by a cashier or clerk at a remote billing location to permit direct customer tank-injection of fuel in predetermined or unlimited amounts.

BACKGROUND, BRIEF SUMMARY, AND OBJECTIVES OF INVENTION

In conventional fuel dispensing systems, it is necessary to have each car serviced personally by a station attendant which logically leads to high operational and maintenance costs, and, when the staff maintained is not sufficient to offer immediate attention, causes the customer undue delay and inconvenience because of the waiting periods often experienced.

A number of automatic dispensing systems have been developed to overcome the insufficiencies of conventional services, particularly representative of which is the disclosure of U.S. Patent No. 3,033,421 for a dispensing system, though this system and others similar to it require mechanical alterations in the dispensing apparatus and thus are expensive to develop and costly to maintain.

The present invention places complete control of the dispensing of fuel products at a service center in the hands of a cashier or clerk at a remote billing location while permitting the customer to dispense fuel in predetermined or unlimited amounts without mechanical changes to existing equipment. This development requires only that inexpensive circuitry and a number of control switches and relays be installed to operate existing equipment and thus permits adaptation and compatability with conventional existing dispensing equipment without radical or expensive alterations.

The invention comprises a console located at the remote billing location, which console houses the dispenser controls and circuitry. The console operator-clerk initiates a dispensing operation by depressing a START button which makes available power at the dispenser pump switch which starts the pump motor, allowing the customer to dispense gasoline according to the instructions and orders given the operator by the customer over an intercommunication system stretching between the dispensers and the remote billing location which instructions are then programmed into the system through the console operator. The operator may pre-set a definite fuel quantity for dispensing by the customer after which the system will automatically shut down, or alternatively, the operator may program the system to permit unlimited dispensation of fuel by the customer until the customer's tank is full.

A pre-set counter is used to program a pre-selected amount of fluid to be dispensed, and this device is pulsed backward from a customer requested and operator set amout until it reaches zero at which time a contact is open and the system is shut down. Simultaneously, a totalizing counter pulses forward and records the money value of fluid products delivered. The totalizer has a manual re-set lever which allows an erasure after each sale, through this totalizer may be used without re-setting to give a true total dispensation. The counters are operated by a reed switch triggering a gate controlled A.C. solid state switch-Triac and amplifier, and when power is supplied to the dispenser pump switch and gasoline has been dispensed by the customer either as a pre-set or fill-up amount, gasoline flow causes a conventional gasoline pump computer wheel carrying ten magnets inside to act on the reed switch and pulse it once for each cent's worth of product delivered.

The circuitry involved in the present system utilizes four basic operating coils and a number of holding circuits along with a time delay network, the delay network establishing an alternate power source feed by means of a thermal switch operative a few seconds after a first energized circuit is established by depressing the START switch. This thermal switch also functions as a safety device in that if the dispenser pump motor switch is opened during product delivery, a shut-down occurs and the START switch may again be displaced to restore the dispenser in running condition after the thermal switch has cooled and re-opened. The time delay network holds the system in a shut-down condition for approximately ten seconds until the thermal switch has opened.

With the foregoing in mind, it is, therefore, a primary object of the present invention to provide an automatic pre-set dispensing system which will permit the delivery of a predetermined quantity of gasoline to the customer's tank upon the triggering of the pump switch by the customer and the termination of that delivery when the selected quantity has been dispensed.

Another object of the present invention is to provide an automatic pre-set dispensing system of the type described having flexibility to permit delivery of an indefinite quantity of gasoline for those customers who desire to purchase a full tank of gasoline.

Yet another object of the present invention is to provide an automatic pre-set dispensing system having a totalizing counter associated with the system for recording and totalizing the individual quantities of fluid dispensed by each setting of the console or each customer serviced.

These and other objects of the present invention will become more apparent from a consideration of the accompanying drawings constituting a part hereof in which like characters of reference designate like parts.

FIGURE DESCRIPTION

Figure 3:
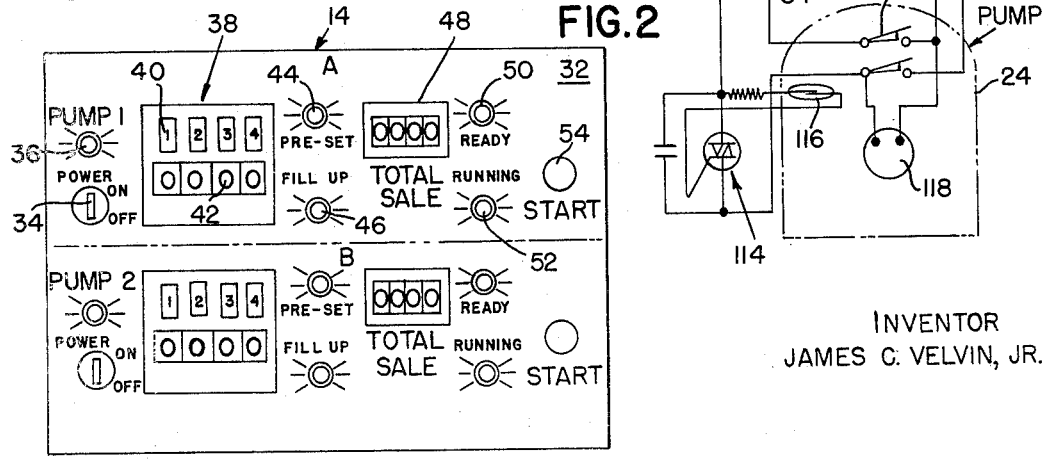

FIG. 3 is a plan view of the operating surface of the console control unit associated with the present pre-set automatic dispensing system which is operated by a cashier or clerk at a location remote from the dispenser to program a predetermined or unlimited quantity of gasoline for self-service dispensing by the customer, the unit having associated means to record and totalize the quantities of fuel dispensed.

DETAILED DESCRIPTION OF THE INVENTION

Figure 1:
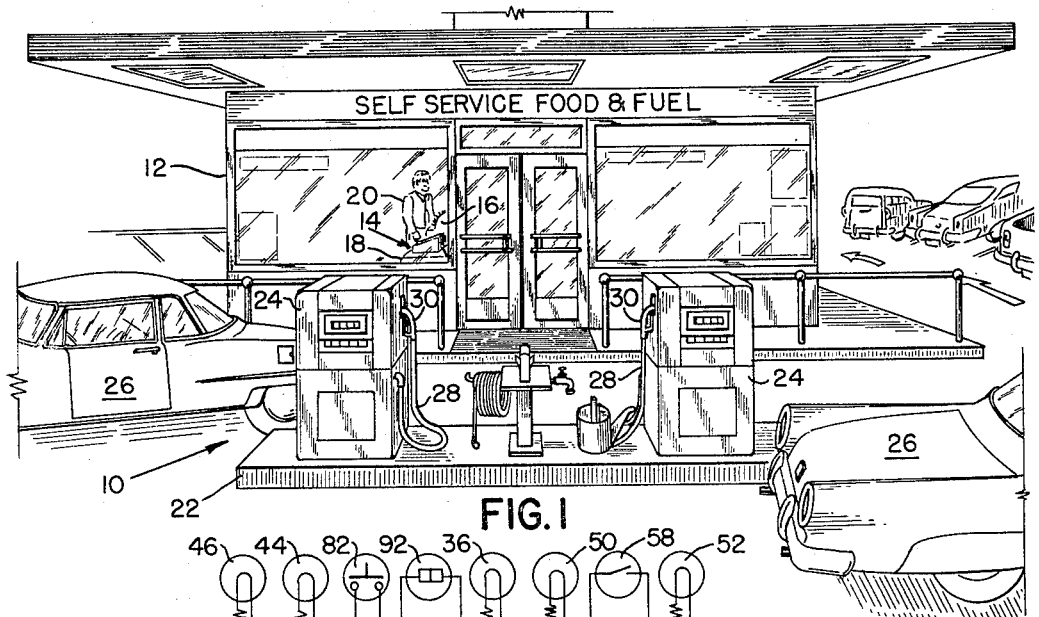
FIG. 1 is a general perspective view of a service center adapted to utilize the present invention in conjunction with dispensing apparatus which is controlled by an operator in a remote location.
Figure 2:
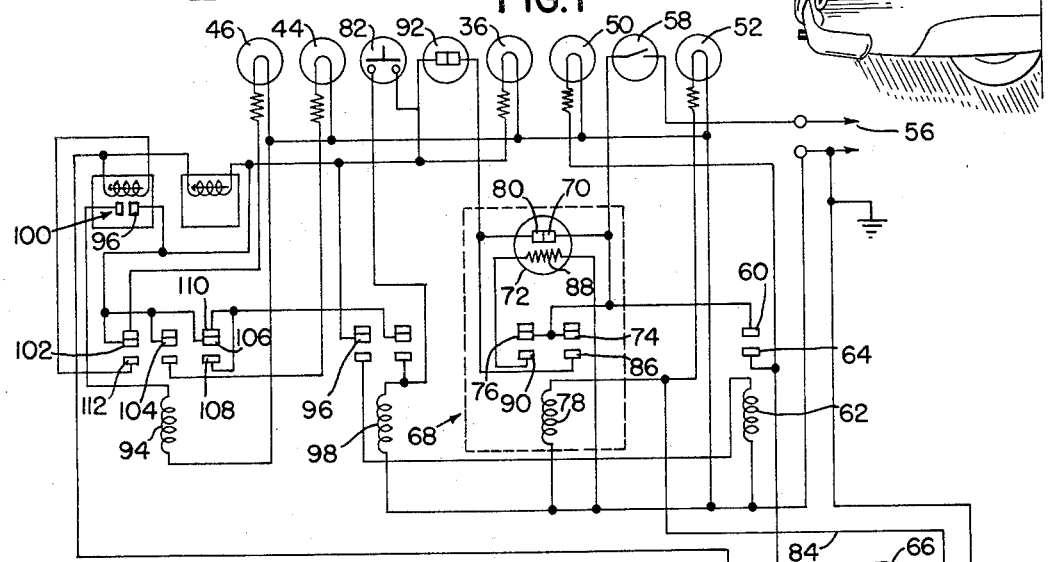
FIG. 2 is a schematic diagram of the electrical circuit associated with the present invention illustrating the pre-set control of dispensing of fluid products from a remote location.

There is generally shown in FIG. 1 an installation adapted to utilize a pre-set control system according to the present invention wherein a main service area generally indicated as 10 is bordered by an enclosed facility 12 in which a console generally designated 14 is located adjacent the cash register 16 on the check-out counter 18 preferably within view of the service area. An operator or clerk 20 is thus able to maintain an uninterrupted and unobscured view of the area which is provided with one or more gasoline dispensing islands 22 carrying one or more dispensers or pumps 24 that are controlled by the pre-set dispensing system later to be described. Automobile 26 can be positioned directly adjacent to the island 22 in a conventional manner so that dispensing can be effected by the customer from the pumps 24 through the hoses 28 and dispensing nozzles 30 associated therewith. The function of the console is to give a cashier or clerk complete control over the dispensing of fuel products from a remote control location when delivery is taken by the customer at the fueling point.

Console 14, the top surface 32 of which is shown more particularly in FIG. 3, is of any convenient size. Surface 32 can be divided into two or more sections depending upon how many pumps are to be controlled, and for illustrative purposes only, there is shown herein a duplex unit for the control of two pumps 24 such as are positioned on island 22 in FIG. 1. One section designated A of the duplex unit shown in FIG. 3 will now be described in detail.

A key switch 34 supplies power to the particular section involved, and a power-on light 36 indicates power delivery when the key 34 is in the ON position. A pre-set counting device shown generally as 38, representative of which is a Durant counter manufactured by the Durant Manufacturing Company, is positioned immediately to the right of the key switch, and permits the operator to pre-set the amount of fuel to be delivered by adjusting the thumbwheels 40 which set the indicating dials 42 of the counter. To the right of the pre-set counter are a pair of indicating lights 44 and 46, the first 44 indicating when an amount is set into the pre-set device and cutting off after delivery of this amount, and the second, 46, indicating that the unit will deliver any amount of fuel a customer desires until the dispensing operation is interrupted by either the customer or the attendant.

To the right of these lights is a push button re-set type totalizing counter 48 which indicates the sale made by functioning on every penny of every sale. This counter may be re-set by the clerk only. Two additional lights 50 and 52 are located to the right of the total sale counter, the first comes on when the START switch 54 is depressed (supplying power to the pump switch) to indicate the pump in condition for operation in a conventional manner. The second light 52 comes on when the pump nozzle is removed and the starting handle depressed indicating to the operator that the customer is taking delivery.

Power is supplied to the pre-set system from a central supply or breaker box (not shown) and is introduced to the console through a pronged switch (not shown), the energized side of which is applied to the system at reference point 56. The circuit extends from the emergency switch 58 directly to the contact 60 of power relay 62. The second contact 64 associated with relay 62 goes directly to the pump switch 66 controlled by the system.

A second circuit junctions with the energized contact 60 of relay 62 and enters a thermal relay network generally designated 68 through contact 70 of thermal relay 72 and contacts 74 and 76 of relay 78.

The energized circuit extends through pin 80 of thermal relay 72 when the system is active, that activation being achieved by the emergency switch 58 being closed, the power switch 34 being closed and the ready switch 82, a push button type, being depressed.

The thermal relay network 68 is the time delay section and functions as will be described. When the emergency switch 58 is closed and the unit is dormant (the contacts or bridging pins 70 and 80 of the thermal relay 72 are closed), a circuit is established as above described, but upon activation of the system, the thermal relay complex is ready to receive information which is supplied by a conductor 84 from the pump switch 66 in the dispenser thus indicating the pump switch has been closed and power is being supplied to the pump which, in turn, should be running. Conductor 84 thus activates coil 78 thus allowing voltage to the balance of the control circuitry through contact 86 which closes against contact 74 when relay 78 is energized and contact 80 of the thermal relay. Simultaneously, the power is supplied to the heater element 88 through contact 90 of relay 78 causing a dimetallic blade (not shown) bridging pins 70 and 80 to bend thus breaking continuity after a predetermined amount of time, usually in the order of two to four seconds. Relay 78 continues to supply the other functions of the console until such time as there is an interruption in the information from the pump switch. This can be caused by the pump being turned off, the end of delivery effected by a pre-set sale, interruption of the power by power failure, turning the emergency switch off, or turning the power switch off. An interruption of voltage from the pump switch 66 causes relay 78 to fall out, thus isolating contacts 86 and 90 of relay 68 from their associated contacts 74 and 76 and breaking the power supply to the remainder of the circuit as the switch blade in thermal relay 72 is opened. The pump cannot be reactivated until relay 72 has cooled and the activation process repeated.

Power from the thermal relay network 68 supplies voltage to the power switch 92 through which a circuit is established to the POWER ON light 36, the common side of all contacts in relay 94, contact 96 of the pre-set device 38, one side of START switch 82, and contact 96 of relay 98. From switch 92, a circuit is established through START switch 82, which supplies power to close relay 98, a single pole double throw microswitch generally designated 100 in the pre-set counter 38 and then to contacts 102, 104 and 106 of relay 94 which is the common side of all contacts in that relay. Microswitch 100 is in the closed position when an amount has been pre-set and is open when no amount is pre-set.

When an amount is pre-set through thumbwheels 40 of counter 38, relay 94 becomes energized thus supplying holding voltage through its associated contacts 106 and 108. When no amount is pre-set, holding voltage is supplied through contacts 106 and 110 of relay 94. Note that when an amount is pre-set, relay 94 is energized, and upon the complete dispensing of this amount, the switch 100 in the pre-set counter opens, relay 94 falls out, and contacts 106 and 110 separate while contacts 106 and 108 close, this interruption of holding voltage allowing relay 98 to fall out.

The function of relay 98 is to lock in that relay and supply power from the energized side of relay 62 which has been previously described.

The total sale counter 48 receives its supply of voltage from the control side of the emergency switch 58, and the pre-set counter 38 gets its supply of voltage from contacts 102 and 112 of relay 94 which allows it to count only when relay 94 is energized, i.e., when an amount has been pre-set. The voltage pulse which causes the pre-set counter to count down and the total sale counter to advance is supplied by a gate controlled A.C. solid state switch (Triac) and amplifier generally designated 114 which completes the neutral leg of the counter circuit. The trigger for the amplifier is a glass enclosed magnetic reed switch 116 which is opened and closed by ten (10) magnets within the penny wheel of the computer (not shown).

Flow from the pump 24 is stopped when the pump switch 66 is opened or when relay 62 is de-energized causing the pump motor 118 to stop and a normally closed solenoid valve (not shown) controlling the orifice of the nozzle 30 to close.

As delivery proceeds after a pre-set amount has been programmed into the pre-set counter 38, the counter pulses back toward zero. At zero, its contact 96 and 120 separate and relay 94 is de-energized. This momentary interruption is sufficient to drop out relay 98 which de-activates relay 62 and shuts down the pump 24. If the pump switch 66 is now opened, relay 78 opens, removing power from the thermal network 68. Push button operation cannot operate the system at this time until thermal relay 72 has cooled and its normally closed contacts have reclosed, this occurring usually within ten seconds.

If the pump switch is opened during delivery, a similar shutdown occurs because relay 78 will open, breaking the AC supply to all relays and de-activating the pump. Since all relays have opened, the start button operation must again be made to restore the running condition after the thermal relay has cooled and reclosed.

Thus in the broadest sense the present invention includes a device for controlling the dispensing of a pre-set quantity of fluid which is associated with the conventional fuel dispensing pump having a pre-set counter for indicating and storing information commensurate with the total quantity of fluid to be dispensed, a Triac amplifier connected to the pump and pump computer responsive to the delivery of incremental quantities of fluid by the pump to the valve to the pump hose nozzle which amplifies signals generated by computer wheel magnets acting on a reed switch, and a relaying scheme adapted to operatively monitor the generated and amplified signals corresponding to the quantity of fluid dispensed and cause the pre-set counter to count down from the total stored in that counter. The relaying scheme is such that the pump is de-activated thus terminating delivery of fluid when the pre-set counter has received delivery signals commensurate with the total quantity of fluid to be dispensed. The invention also has a total sales counter which is associated with the other components of the pump and pre-set system for recording and totalizing the individual quantities of fluid dispensed by each setting of the pre-set counter. The relaying scheme is also designed to by-pass the pre-set counter when desired to allow the dispensing of an indefinite quantity of fluid should that be necessary.

Thus there has been described a preferred embodiment of a pre-set control system for dispensing automotive products at a service center which incorporates a number of advantages over conventional systems. In case of fire, the operator is not likely to be incapacitated as an attendant in a conventional service station would be, and he would, therefore, be able to take emergency measures to handle the emergency. The console not only controls all power to the pumps, but also closes valves which are not in standard type installations thus preventing fire being fed by fuel from other tanks.

While a preferred embodiment has been specifically described, it will be obvious to those skilled in the art that modifications may be made in the console unit, the control circuitry, the slow-down feature and the pre-set unit as well as other phases of the present inventive concept without departing from the spirit of this invention, and such modifications are contemplated.

I claim:
1. In an apparatus for dispensing fluid from a reservoir, the apparatus including a delivering nozzle, a computer having a signal generating magnet-carrying pennywheel, a pump for delivering a quantity of fluid from the reservoir to the nozzle, the improvement for automatically controlling the dispensing of a pre-set quantity of fluid, said improvement comprising: a pre-set counter manually operable for indicating and storing information commensurate with the total quantity of fluid to be dispensed; means associated with said pre-set counter for activating the pump; a triac amplifier operatively responsive to signals generated by the magnet-carrying pennywheel upon delivery of incremental quantities of fluid by the pump to amplify said signals; and means terminating delivery of fluid when the counter has received delivery signals commensurate with the total quantity of fluid to be dispensed, said counter operatively responsive to the delivery of incremental quantities of fluid and signals generated by said magnet-carrying pennywheel as a result thereof to count down from the total indicated and stored therein, said pump activating means including a delay network having a thermal switch to provide an alternate operative connection with said power source for supplying the pre-set system upon operation of said thermal switch subsequent to the initial activation of said pump.

2. The apparatus of claim 1, further comprising means independent of said pre-set improvement for dispensing an indefinte quantity of fluid.

3. The apparatus of claim 2, further comprising totalizing means associated with the pump, computer and said indicating and storing pre-set counter for recording and totalizing the individual quantities of fluid dispensed by each setting of the pre-set counter.

4. The apparatus of claim 3, said disabling means including contact means associated with said pre-set counter operable to disable the pump upon receipt of delivery signals commensurate with the total quantity of fluid to be dispensed.

References Cited
UNITED STATES PATENTS

| | | | |
|---|---|---|---|
| 3,199,727 | 8/1965 | Romanowski | 222—20 |
| 3,211,332 | 10/1965 | Thielen | 222—20 |
| 3,278,082 | 10/1966 | Thielen et al. | 222—20 |
| 3,346,142 | 10/1967 | Eklund | 222—20 |
| 3,353,710 | 11/1967 | Romanowski | 222—20 |

OTHER REFERENCES

"Silicon Controlled Rectifier Manual," published by General Electric Co.—Received by the Patent Office on June 25, 1962; front page and page ii only.

"Triac Control for A.C. Power," published May 1964 by the General Electric Co.; front page and page 1 only.

SAMUEL F. COLEMAN, Primary Examiner

H. S. LANE, Assistant Examiner

U.S. Cl. X.R.

220—76